United States Patent [19]
Krofchak

[11] Patent Number: 5,749,962
[45] Date of Patent: *May 12, 1998

[54] METHOD OF MAKING CEMENT FROM BASE METAL SMELTER SLAG

[75] Inventor: David Krofchak, Copper Cliff, Canada

[73] Assignee: Fenicem Minerals, Inc., Copper Cliff, Canada

[*] Notice: The term of this patent shall not extend beyond the expiration date of Pat. No. 5,593,493.

[21] Appl. No.: 756,861

[22] Filed: Nov. 26, 1996

Related U.S. Application Data

[63] Continuation-in-part of Ser. No. 494,665, Jun. 26, 1995, Pat. No. 5,593,493.

[51] Int. Cl.⁶ .......................... C04B 7/147; C04B 7/153; C04B 7/19
[52] U.S. Cl. .................. 106/714; 106/789; 106/819; 106/816
[58] Field of Search .................. 106/714, 789, 106/819, 790, 816

[56] References Cited

U.S. PATENT DOCUMENTS

| 4,761,183 | 8/1988 | Clarke | 106/714 |
| 5,593,493 | 1/1997 | Krofchak | 106/789 |

FOREIGN PATENT DOCUMENTS

| 963482 | 2/1975 | Canada | 106/714 |

*Primary Examiner*—Michael Marcheschi
*Attorney, Agent, or Firm*—Rogers & Scott

[57] ABSTRACT

Cement is made from base metal smelter slag produced by a nickel, copper, lead or zinc smelter. The slag is ground to a size within the range of from about −250 to about 425 mesh to produce ground slag cement, and the ground slag cement is mixed with Type 3 high early strength Portland cement in a ratio of at least about 0.5:1 by weight to produce a blended cement.

4 Claims, No Drawings

5,749,962

METHOD OF MAKING CEMENT FROM BASE METAL SMELTER SLAG

This application is a continuation-in-part of U.S. patent application Ser. No. 08/494,665 filed Jun. 26, 1995 U.S. Pat. No. 5,593,493.

FIELD OF INVENTION

This invention relates to the making of cement from base metal (copper, nickel, lead or zinc) smelter slag to produce a blended cement which can be used in making concrete or as a binder for solidifying waste materials such as mine tailings.

Base metal smelter slag typically contains by weight from about 15 to about 40% silica ($SiO_s$), from about 35 to about 60% iron oxide ($Fe_2O_3$), from about 2 to about 20% calcium oxide (CaO), from about 1 to about 5% of various other compounds such as MgO, $Na_2O$, $K_2O$, and trace amounts of metals such as nickel, copper, lead, zinc and cobalt.

BACKGROUND OF THE INVENTION

In Canada, the recovery of copper, nickel, lead and zinc from their ores in smelters produces over 12 million tons of smelter slag per year. Since about 1900, some slags have been used for rail ballast, but usually large slag heaps have accumulated near the smelters. In recent years, at various mines in Europe and Australia, some smelter slags (usually copper smelter slags) have been ground to about –325 mesh and mixed with regular Portland cement to produce a blended cement for use in cemented mine backfill. However, the rate of generation of the slags still far exceeds their utilization. No one, so far as is known, has produced high grade cement suitable for general use in construction work and elsewhere using slag cement made from base metal smelter slag.

During the 1980's, the pozzolanic (i.e. cementing) properties of Canadian smelter slags were studied to evaluate the feasibility of their use as a partial replacement for regular Portland cement in concrete and mine backfill. It was concluded that these slags could be so used. However, the results were much inferior to those obtained with regular Portland cement and mixtures of regular Portland cement with steel mill blast furnace slag. Consequently, the work was discontinued. It was also found that the economics were unsatisfactory.

It has recently been found that large smelter slag heaps are leaching unacceptably high amounts of heavy metal values, and mining companies are seeking acceptable solutions to this growing problem. Also, environmental authorities are requiring that plans be formulated for long term permanent solutions.

It is therefore an object of this invention to provide a method of using base metal smelter slag to manufacture a blended cement which is suitable for general construction purposes, including mine backfill, which will be equal to or better than regular Portland cement and mixtures of regular Portland cement with blast furnace slag.

SUMMARY OF THE INVENTION

According to the invention, a method of making cement from slag produced by a nickel, copper, lead or zinc smelter includes grinding the slag to a size within the range from about –250 to about 425 mesh to produce ground slag cement, and mixing the ground slag cement with Type 3 high early strength Portland cement in a ratio of at least about 0.5:1 by weight to produce a blended cement. The grinding may be dry grinding or wet grinding.

The invention is based on the discovery that Type 3 high early strength Portland cement is more reactive than other grades of Portland cement and has an activating effect on base metal smelter slag (which is essentially $FeO.SiO_2$) to produce a compound of the form $3CaO.FeO.Al_2O_3.3SiO_2.3H_2O$ (which is a giant metallic silicate molecule). Thus, the invention enables cement to be produced which is superior to that produced by the use of regular Portland cement with steel making blast furnace slag.

Advantageously, the ground slag cement is mixed with the Type 3 Portland cement in a ratio from about 0.5:1 to about 1.5:1 by weight to produce the blended cement.

Sand, stone and water can be added to the blended cement to produce concrete. Alternatively, the blended cement may be used, for example, as a binder for mine tailings.

It is known that tying up heavy metals as metallic silicates renders them substantially insoluble in water, and thereby non-leachable, since Portland cement contains metallic silicates which react with the metal values. With the present invention, this is automatically accomplished while simultaneously making concrete with the blended cement.

VARIOUS EXAMPLES OF THE INVENTION WILL NOW BE DESCRIBED.

EXAMPLE 1

A composite sample of base metal smelter slag was obtained from a slag heap which has accumulated over 50 years from one of the world's largest nickel producers located in Sudbury, Ontario, Canada. This sample was ground to –325 mesh and analyzed as follows: (by weight)

| | | | |
|---|---|---|---|
| $SiO_2$ | 35.66% | $TiO_2$ | 0.32% |
| $Al_2O_3$ | 5.59% | MnO | 0.07% |
| $Fe_2O_3$ | 53.00% | Co | 0.20% |
| CaO | 2.75% | Cu | 0.20% |
| MgO | 2.53% | Ni | 0.40% |
| $Na_2O$ | 0.87% | S | 1.46% |
| $K_2O$ | 0.65% | | |

The specific gravity of the ground slag was 3.67, the specific gravity of Portland cement being about 3.15. Since the American Society for Testing Materials (ASTM) has established a procedure for evaluating acceptable quality standards for slag cements for use in concrete and mortars (C989), this procedure has been followed in the following tests so that the results conform to standards of acceptance in the concrete industry.

This procedure requires 2" cubes to be made using graded sand and regular Portland cement as a reference, and cubes of the same size to be made with graded sand and a mixture of ground slag cement and Type 3 Portland cement in accordance with the invention (invention cubes).

For the invention cubes to meet ASTM standards, the compressive strength of the invention cubes must be at least 70% of that of the reference cubes.

The results of comparative compression strength tests are as follows:

| Mix Proportions | | | | Compressive | |
|---|---|---|---|---|---|
| Cement | Sand | Slag | Water | Strength, psi | |
| gm | gm | gm | gm | 7 Day | 28 Day |
| Reference Cubes | | | | | |
| 500 | 1375 | — | 250 | 4050 | 5470 |
| Invention Cubes | | | | | |
| 250 | 1375 | 375 | 250 | 6080 | 7050 |

It will be noted that the ratio of ground slag cement to Type 3 Portland cement in the invention cubes was 1.5:1

From these results, it is clear that the invention cubes were significantly stronger than the reference cubes, far exceeding the minimum 70% requirement to meet ASTM standards for use in concrete and mortars.

EXAMPLE 2

Tests were carried out to more clearly show that the use of Type 3 Portland cement in accordance with the invention produces an unexpected result in making concrete compared to the use of regular (Type 1) Portland cement when blended with ground base metal smelter slag. In each case, the slag/cement weight ratio was 1.5:1.

| | | Compressive Strength,psi | | |
|---|---|---|---|---|
| Test No. | Composition of Cube | 7 day | 28 day | 90 day |
| 1. | Slag/regular Portland cement and sand | 3378 | 4920 | 6470 |
| 2. | Slag/Type 3 Portland cement and sand | 6080 | 7050 | 9220 |

Test 2 using Type 3 Portland cement in accordance with the invention shows the dramatically higher strength than Test 1 using the regular Portland cement. The tests are proof that Type 3 Portland cement activates base metal ground slag significantly better than regular Portland cement. This is a totally unexpected result.

EXAMPLE 3

In this test, the durability of an invention cube from Example 1 was examined with respect to its durability in "freeze/thaw" conditions this being particularly important in cold climates such as Northern Canada.

A 2" cube in accordance with the invention was placed in a freezer at −20° C., removed therefrom daily and immersed in water at 21° C. and placed in the freezer 12 hours later, i.e. thawed in water during the day and frozen in the freezer over night. This procedure was continued in accordance with ASTM test method C666 which calls for 300 freeze/thaw cycles. This was done, and it was observed that the invention cube had no damage, such as spalling of the surfaces, demonstrating that concrete produced in accordance with the invention has good durability to resist exposure conditions which are the most destructive factors causing deterioration in concrete.

EXAMPLE 4

A major problem now facing base metal smelters all over the world is the growing piles of slag which authorities have determined leach unacceptable values of heavy metals such as nickel, copper, lead, zinc, etc. Prior art, and in particular U.S. Pat. No. 4,110,212 (Krofchak), teaches that silica compounds such as tri-calcium-aluminum silicate (Portland cement) tie up heavy metals as insoluble silicates which stop them from leaching. In this example, ground slag was leached in water/acid in accordance with Environment Protection Agency (EPA) test standards, and was found to leach unacceptable amounts of heavy metals as follows:

| Metals | Leach, ppm | EPA Standard, ppm |
|---|---|---|
| Ni | 10 | 5 |
| Cu | 20 | 5 |
| Fe | 45 | 5 |

A concrete cube in accordance with the invention from Example 1, which had been crushed for a compression test, was leached under the same conditions. No detectable amounts of nickel, copper or iron were found, proving that the Portland cement/concrete had tied up the heavy metals in such a manner that they did not leach and therefore met regulation standards.

EXAMPLE 5

A series of 2" concrete cubes in accordance with the invention were made with varied slag/Type 3 Portland cement weight ratios. The results of compression strength tests carried out thereon are as follows: Cube Mix Proportions in Grams Slag/Cement Ratio Compressive Strength, psi

| | Mix Proportions in Grams | | | | Compressive Strength, psi | |
|---|---|---|---|---|---|---|
| | Type 3 Portland | | | | | |
| Cube | Cement | Sand | Slag | Slag/Cement Ratio | 7 Day | 28 Day |
| A | 330 | 1375 | 162 | 0.5:1 | 5612 | 7010 |
| B | 250 | 1375 | 250 | 1:1 | 3650 | 4800 |
| C | 256 | 1375 | 375 | 1.5:1 | 6080 | 7050 |
| D | 250 | 1375 | 500 | 2:1 | 5420 | 6130 |
| E | 125 | 1375 | 375 | 3:1 | 2950 | 4840 |

From these results it can be seen that:
1) The cube with the highest strength was cube C, with a ratio of slag cement to Type 3 Portland cement of 1.5:1.
2) Reducing the radio of slag cement from 1.5:1 as in cube B reduced the strength. Similarly, increasing the ratio from 1.5:1 as in cube D also reduced the strength. However, in each case, the compressive strength was still acceptable in accordance with prescribed standards.

The purpose of this example was to demonstrate the range of the invention. This example also shows that considerable excess smelter slag above the 1.5:1 ratio is acceptable, which thereby provides an increased opportunity for use of the slag in a safe manner without seriously impairing the compressive strength of a resultant concrete product below ASTM standards.

EXAMPLE 6

In the previous examples, the slag was ground in a dry state. This example demonstrates that the grinding can also be carried out in water.

Base metal smelter slag was ground to −325 mesh in water and stored in an agitated vessel for 10 days. The slag to water ratio was 0.5:1 by weight. 2" invention cubes were then made as before, and their compressive strength measured. The results were as follows:

| Mix Proportions in Grams | | | Compressive Strength, psi | | |
|---|---|---|---|---|---|
| Type 3 Portland Cement | Sand | Slag | 7 days | 28 days | 90 days |
| 250 | 1375 | 375 | 4908 | 5260 | 9120 |

It will be noted that the ratio of slag cement to Type 3 Portland cement was 1.5:1.

Thus, the invention enables base metal smelter slag to be used to make a satisfactory blended cement while at the same time providing a solution to a growing environmental problem. In other words, with the present invention, an economic and viable solution has been provided for use of a waste material. As indicated previously, the blended cement produced in accordance with the invention can be used to make concrete. Another possible use is as a binder for mine tailings.

Other embodiments of the invention will be readily apparent to a person skilled in the art, the scope of the invention being defined in the appended claims.

I claim:

1. A method of making cement from base metal smelter slag produced by a nickel, copper, lead or zinc smelter, said slag containing by weight from about 15 to about 40% silica ($SiO_2$), from about 35 to about 60% iron oxide ($Fe_2O_3$), and from about 2 to about 20% calcium oxide (CaO), comprising:

grinding the slag to a size within the range of from about −250 to about 425 mesh to produce ground slag cement, and mixing the ground slag cement with Type 3 high strength Portland cement in a ratio of at least about 0.5:1 by weight to produce a blended cement.

2. A method according to claim 1 wherein the ground slag cement is mixed with the Type 3 Portland cement in a ratio of from about 0.5:1 to about 1.5:1 by weight to produce the blended cement.

3. A method according to claim 1 wherein sand, stone and water are added to the blended cement to produce concrete.

4. A method according to claim 2 wherein sand, stone and water are added to the blended cement to produce concrete.

* * * * *